Figure 1:
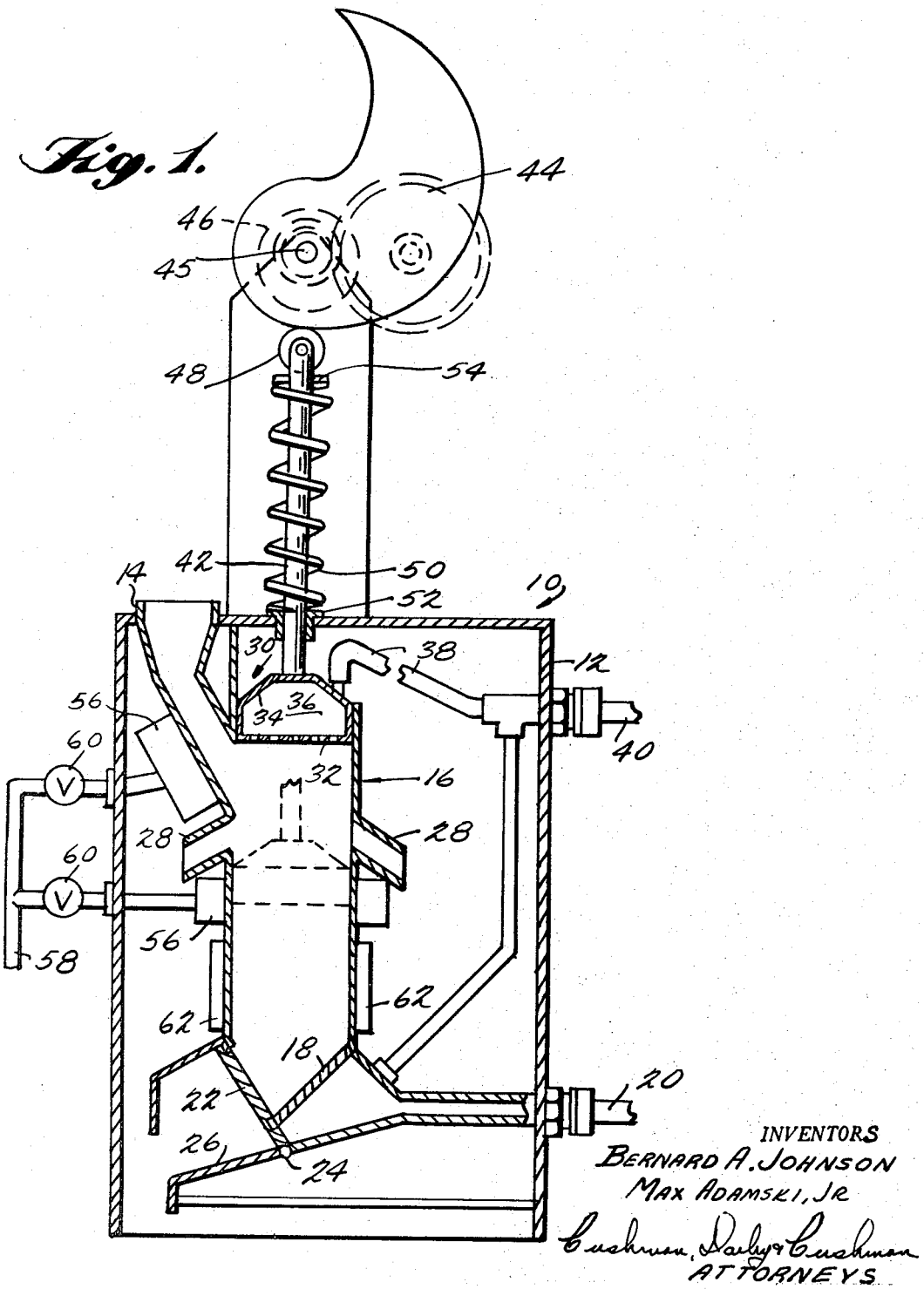

United States Patent Office 3,416,376
Patented Dec. 17, 1968

3,416,376
SURFACE AREA MEASUREMENT OF VARIABLE
LENGTH SAMPLE OF FINELY DIVIDED SOLIDS
Bernard A. Johnson, Deerfield, and Max Adamski, Jr.,
Wheeling, Ill., assignors to Fuller Company, Catasauqua, Pa., a corporation of Delaware
Filed Nov. 30, 1966, Ser. No. 598,097
10 Claims. (Cl. 73—432)

This invention relates to a novel technique for preparing and testing a sample of comminuted solid material to determine the fineness of the material. More particularly, it relates to improved apparatus and methods which make use of the known relationship between the fluid permeability of a sample of powdered material and the particle size of the material.

The known fluid permeability tests for determining the particle size of a powdered solid material are based on the principle that the resistance to the flow of a fluid through the sample is a function of, among other variables, the total surface area of the sample. When these other variables are eliminated, or standardized, the permeability measurement is directly related to the surface area of the sample. The surface area measurement may be readily converted by a simple calculation to particle size provided the density, size and shape of the sample are known or at least constant for each sample.

More specifically, permeability tests are based on the following mathematical relationship known as the Kozeny-Carman equation:

$$S^2 = \frac{g_c}{\mu v K \rho} \frac{\Delta p}{L} \frac{\epsilon^3}{(1-\epsilon)^2}$$

where:

$S$=surface area
$g_c$=gravitational constant
$\mu$=fluid viscosity
$K$=shape factor of the sample
$L$=length of sample
$\epsilon$=porosity of sample, percentage volume of voids per unit total volume
$p$=fluid presure differential across the sample
$v$=fluid velocity through the sample
$\rho$=density of sample material For any particular series of tests on the same kind of material at the same temperature and with the same permeability measuring instrument, $K$, $\rho$ and $\mu$ may be assumed to be constants, thus leaving four variables, $L$, $\epsilon$, $\Delta p$ and $v$. It is conventional practice to prepare a sample by weighing out a predetermined standard weight of the powdered material and compacting it to a predetermined volume of standard shape before subjecting it to a permeability test. Conventionally, also the permeability testing instrument employs a single gas under standard conditions for each sample. For each test, therefore, the values for $\mu$, $K$, $L$, $\rho$ and $\epsilon$ are constant. This leaves the surface area, $S$, a direct function of the differential pressure and the gas flow velocity which the testing instrument is designed to measure. When the instrument has been calibrated with a standard sample of known surface area, the permeability measurement of a sample of unknown surface area is directly readable in units of surface area.

The actual measurement of permeability, or resistance to gas flow through the sample under the influence of a pressure gradient is made in practice in any of several different ways. For example, the permeability may be measured by applying an initial differential pressure across the sample and measuring the time required for the differential to reduce by a predetermined value. Alternatively, a constant gas flow through the sample may be established and the pressure differential across the sample measured. Alternatively, a fixed differential pressure may be applied across the sample, and the gas flow rate through the sample is measured. In each case the time, pressure or flow measurements are indications of surface area and may be converted to actual particle size after the instrument has been calibrated in a known manner.

The actual measurements of gas permeability which are briefly discussed above are well suited to manual testing, because the actual measurements can be directly related to surface area without employing data processing equipment. However, the overall technique, which includes a critical weighing step, does not lend itself well to automation of grinding equipment or other process equipment, because of the many operations involved and the expensive and sensitive weighing equipment required.

It is the primary object of the present invention to provide a gas permeability technique for measuring surface area of powdered materials, including both method and apparatus, which retains the operational advantages of known permeability techniques while being well adapted to automated operation and to being readily incorporated in a control loop for a grinding operation or other process.

It is another object of the present invention to provide a method and apparatus for measuring the particle size of powdered materials which achieve advantages of simplicity and economy by eliminating the weighing of the sample of material prior to testing.

It is a more specific object to eliminate the weighing step in measuring particle size with gas permeability techniques by obtaining an unweighed sample of the powdered material to be tested, compacting the unweighed sample to a predetermined porosity, or density, and then measuring the permeability of the compacted sample by a known technique. Compaction of the various samples to a predetermined porosity produces samples of different length, and this variable must be compensated for because surface area is inversely related to sample length when a permeability technique is employed. According to the principles of the present invention, the length of the sample is measured, and the measurement is employed in the form of a correction factor, $L$, which is impressed on the initial permeability measurement. The final compensated measurement is equivalent to the permeability of a sample which is of standard density and standard length. It follows that the compensated measurement is indicative of the surface area and particle size of the sample.

In the illustrative description of a preferred embodiment of the invention which follows, the obtaining of the initial sample and compaction of the same to a predetermined porosity is effected by placing a portion of the powdered material in a vertical tube or the like and forcing a piston downwardly on top of the sample while measuring the electrical capacitance of the sample. When the capacitance measurement reaches a predetermined value, the piston is stopped, and the gas permeability of the compacted sample is tested by a known technique. The length compensating factor, $L$, is a measure of the length of the compacted sample and may be obtained by measuring the extent of travel of the piston during the compaction step.

Referring more specifically to the capacitance measurement, it will be appreciated that the actual value of the capacitance is a function of the compactness, or porosity, of the sample and the dielectric constant of the material being tested. When the composition of the test samples does not vary, the dielectric constant is the same for all samples, and the capacitance is a direct function of porosity.

It will be understood that the important feature of the invention is the preparation of a variable length sample of standard porosity and the subsequent compensation of the measured permeability value by a variable length factor, L. That is, the success of the invention does not require that the compaction step, the permeability measurement and the determination of the length factor, L, be carried out by the specific apparatus illustrated in the drawing.

Figure 2:
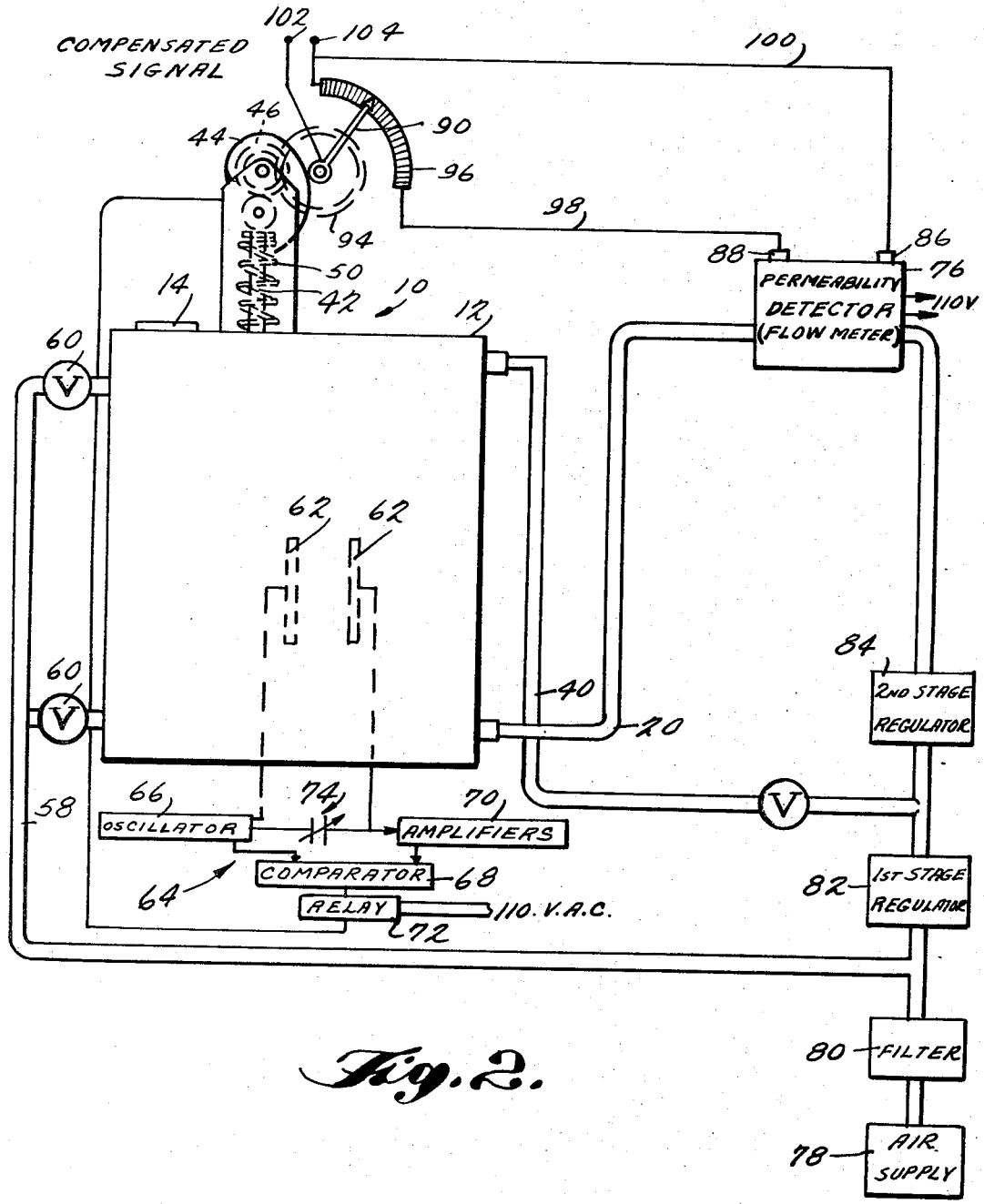

The invention will be further understood from the following detailed description taken with the drawings in which:

FIGURE 1 is a diagrammatic vertical sectional view of a test chamber for preparing and testing a sample of powdered material; and FIGURE 2 is a schematic view illustrating in simplified form the control of the test chamber of FIGURE 1.

Referring to FIGURE 1, there is shown therein a test chamber 10 embodying the principles of the present invention and adapted to compact a sample of powdered material and to retain the compacted sample while its permeability is measured. For convenience, the components are mounted in a casing 12 which is provided at its upper end with an inlet chute 14 for receiving dry powdered material to be tested. A vertical cylindrical sample tube 16, of, for example, 2-inch diameter is mounted within the casing 12 and communicates near its upper end with the inlet chute 14. The lower end of the sample tube 16 is provided with an inclined porous plate 18 through which test air is delivered from an air line 20. The plate 18 may be formed of sintered metal, screening or other material capable of passing gas while providing support for powdered material in the tube 16. It has been found that the pores in the plate 18 may be larger than the size of the particles being tested, and this feature facilitates cleaning of the tube 16 with an air blast. An inclined gate 22 is provided at the lower end of the tube 16 through which powder may be discharged after a test has been completed. The gate 22 is pivoted along its lower edge, as at 24, so as to swing away from the lower end of the sample tube 16 and thereby empty the contents of the latter into a discharge chute 26. The gate 22 may be opened and closed manually by means of a suitable lever (not shown), or it may be operated automatically. Below the junction of the inlet chute 14 with the sample tube 16, are two downwardly inclined overflow chutes 28 which discharge excess powder from the tube 16 at the beginning of a test.

A vertically movable piston 30 is mounted in the sample tube 16 for movement between an upper position in which it is above the junction of the inlet chute 14 and a lower position in which it will compact powdered material in the lower part of the tube 16. The piston 30 is constructed of a flat porous plate 32 and a housing 34 which defines with the plate an interior chamber 36. A flexible tube 38 extends from the chamber 36 to a compressed air line 40 for providing cleaning air when it is desired to purge the sample tube 16.

The upper surface of the piston housing 34 is secured to the lower end of a vertical piston rod 42 which extends through the casing 12 into operative association with a piston drive mechanism. The latter may be of any suitable construction which is adapted to reciprocate the piston 30 in a manner which permits accurate control of the movement. As shown, the drive mechanism includes an eccentric cam 44 driven by the shaft 45 of a motor 46 and disposed to engage a roller 48 carried by the upper end of the piston rod 42. A spiral return spring 50 surrounds the piston rod 42 between a lower bushing 52 secured to the casing 12 and a collar 54 carried by the rod.

To aid in the delivery of powdered material into the sample tube 16 in a uniform manner and to prevent the formation of voids, the inlet chute 14 and tube 16 are provided with vibrators 56. As shown, the vibrators 56 are of a conventional type which operate by compressed air, the frequency of vibration being proportional to the input air pressure. Air is supplied to the vibrators by means of a compressed air line 58 having valves 60 therein to vary the flow to each vibrator.

According to the principles of the present invention, powdered material delivered to the sample tube 16 must be compacted to a standard porosity before the permeability of the sample is measured. In the particular embodiment illustrated, the compaction of the powder to the predetermined porosity is sensed by measuring the electrical capacitance of the powder during the compacting operation. This may be accomplished, briefly, by disposing a pair of capacitor plates 62, one on each side of the sample tube 16 which is constructed of dielectric material applying a high frequency voltage to one plate, and measuring the voltage at the other plate.

Referring now to FIGURE 2, there is shown schematically and in simplified form, electrical and compressed air circuits which are employed for operating the test chamber 10. Considering first the control over the downward or compacting movement of the piston 30, there is shown a circuit 64 for stopping operation of the piston drive motor 46 when the porosity of a compacted sample reaches a predetermined standard value. The circuit 64 includes an oscillator 66 which impresses a constant voltage on one of the capacitor plates 62 and which delivers a constant reference voltage to a conventional comparator 68 device. The other capacitor plate 62 is connected to an amplifier 70, the output of which is transmitted to the comparator device 68 for comparison with the reference voltage. When the two voltages are equal, the comparator device 68 energizes a relay 72 which breaks the circuit between the drive motor 46 and its source of current. The absolute level of the voltage passed to the amplifier 70 is controlled with a variable capacitor 74 connected between the amplifier 70 and the oscillator 66.

The compressed air circuit for measuring the permeability of a sample in the sample tube 16 and for subsequently cleaning the sample tube 16 does not require any special features not conventionally employed with permeability measurements. As shown, there is provided a conventional permeability instrument 76 which is of the type which applies a constant gas pressure differential across a porous sample, simultaneously measures the flow rate of the gas through the sample and produces an electric signal proportional to the gas flow rate. To this end, compressed air from a source 78 thereof is delivered to the instrument 76 after passing through a filter 80 and a pressure control mechanism including two pressure regulators 82, 84. The instrument 76 contains a gas flow meter and a valve arrangement adapted to deliver the constant gas pressure to the line 20 during a testing operation. A voltage proportional to the flow through the sample is established between output terminals 86 and 88. Air for purging the sample tube 16 and for operating the vibrators 56 may be obtained from the source 78 by any convenient connections such as those shown.

According to the principles of the present invention, the voltage signal across the terminals 86 and 88 during a permeability test is compensated, or modified, by an amount which is proportional to the vertical length of the sample in the tube 16. This is accomplished in the illustrated embodiment by electrically measuring the extent of travel of the piston 30 during the compaction step and by combining that electrical signal with the flow rate signal obtained from the instrument 76. As shown, rotation of the motor shaft 45 is converted to arcuate movement of a wiper 90 element by means of a first gear 92 mounted on the motor shaft 45 and meshing with a second gear 94 which carries the wiper element 90. The latter slides over the length of a resistance 96 which is connected across the terminals 86 and 88 by wires 98 and 100. The voltage across contacts 102 and 104, which are connected respectively to the wiper 90 and one end of the resistance 96, represents the gas flow rate through the sample corrected by an amount, L, which is proportional to the length of the sample.

*Operation*

Assuming that the sample tube 16 is clean and empty and that the gate 22 is closed, the operation of the test chamber 10 is as follows. Dry powdered material to be tested is delivered to the inlet chute 14 by hand or by a suitable conveyor and is allowed to fall by gravity into the sample tube 16 until the latter has been filled up to the level of the overflow chutes 28. Excess powdered material passes down the overflow chutes 28 and out the lower end of the casing 12. The chutes 28 therefore automatically provide samples which have approximately the same initial volume. This is desirable, because subsequent compaction will produce sample lengths which fall within relatively narrow limits and which can therefore be easily measured. During the filling operation, the vibrators 56 are operated to maintain a uniform flow of the powder down the inlet chute 14 and to prevent the formation of voids in the sample tube 16. After a predetermined short time interval, the vibrators 56 are turned off.

Next, the loosely packed powder in the sample tube 16 is compacted by lowering the piston 30 until the powder is compacted to a predetermined standard porosity. The final piston position may be for example, as shown in dotted lines in FIGURE 1. This is effected by operating the drive motor counterclockwise so that the cam 44 slowly forces the piston 30 downwardly. As the powder is compacted, the dielectric constant of the sample between the capacitor plates 62 increases causing an increase in voltage from the amplifier 70 in the measuring circuit 64. The output voltage of the amplifier 70 is continuously compared by the comparator device 68 with a constant reference voltage transmitted from the oscillator 66. When the two voltages are identical, the comparator device, functioning as a trigger circuit, energizes the relay 72 which in turn breaks the flow of current to the piston drive motor 46. This, of course, stops the downward movement of the piston 30. Simultaneously with the movement of the piston 30, the wiper 90 is rotated clockwise through the gears 92 and 94 so as to slide over a portion of the resistance 96 to, for example, the dotted line position of FIGURE 2. It will be understood that the capacitor circuit 64 will have been calibrated and standardized previously with a sample of the same material and known density so that the motor cut-off signal for subsequent tests will occur at the same porosity in each case.

After the sample has been compacted, its permeability is measured by means of the permeability detector 76 which is, as previously stated, a conventional instrument employed for this purpose. The particular type of instrument illustrated is the kind which, once set in operation, automatically creates and maintains with the help of regulators 82 and 84 a fixed gas pressure differential across the sample and simultaneously measures the flow rate of the gas through the sample. The instrument contains appropriate valves which deliver a fixed gas pressure to the lower end of the sample through the line 20, this pressure being insufficient to cause any additional compaction of the sample. The gas flows through the lower porous plate 18 and upwardly through the sample in the tube 16 while at the same time the flow meter in the instrument produces a voltage across the terminals 86 and 88 which is proportional to the gas flow. The gas is vented to atmosphere through the vent 83 after passing through the upper porous plate 32 into the piston 30 and through the flexible tube 38. After a test has been completed, as described immediately below, the pressure is relieved in the line 20, the gate 22 is opened, and a blast of cleaning air is delivered through the line 40 to clear the powder from the tube 16.

The magnitude of the gas flow through the sample and the resulting voltage signal at the terminals 86 and 88 depend, of course, on the porosity and length of the sample. The porosity is a constant for all samples owing to the operation of the capacitor circuit 64. The length will vary from sample to sample and is measured electrically by the movement of the wiper 90, the latter being synchronized with movement of the piston 30 by means of the gears 92 and 94. The voltage across the output terminals 102 and 104 depends on the gas-flow voltage across the terminals 86 and 88 and on the position of the wiper 90 so that the final output signal of the system is proportional to the gas flow through a sample of standard length as well as standard porosity. In the illustrated arrangement the final signal is the voltage across the terminals 86 and 88, less the voltage drop, L, across that portion of the resistance 96 between the wiper 90 and the wire 98.

Assuming that the instrument 72 has been calibrated in the usual manner with a sample of the same material of known surface area, the length-corrected signal at the terminals 102 and 104 is a measure of the surface area, or particle size of the tested sample. This is apparent from an examination of the previously discussed equation expressing the relationship between surface area and permeability.

It will thus be apparent that the present invention does not require that the sample to be tested be weighed. This feature effects several advantages of simplicity and economy, because a weighing operation must be carried out as a separate step if complicated equipment is to be avoided. That is, a sample would generally be weighed first and then introduced into a permeability testing tube owing to the obvious difficulties associated with weighing a tube which must subsequently be employed in a highly sensitive operation involving gas flow and gas pressure measurements. It is apparent, also, that the use of a single sampling tube with associated instruments for measuring porosity, length and permeability readily lends itself to automatic control free of supervision by an operator.

Referring somewhat more specifically to the measurement of porosity by the capacitance method, it will be appreciated that the actual capacitance measurement will depend in part on the capacitance of impurities in the sample. It is important, therefore, that the impurity level be low or constant, particularly if the primary component of the sample has a dielectric constant which is much smaller than the dielectric constant of the impurities. The impurities in this sense include any component of the powder, the proportion of which is likely to vary from sample to sample of the same type of material. Moisture is included as an impurity, and in some cases it may be highly desirable to remove this variable by drying both the sample and the test gas before a test.

The method and apparatus are particularly adapted to the manufacture of cement where it is conventional to measure the fineness of the product periodically, and to adjust the operation of the grinding equipment or the classifying equipment, or both, to produce the desired fineness. It is important to obtain a closely graded product because overgrinding of large amounts of material represents an unnecessary expense, and because the strength characteristics of the concrete structure ultimately constructed are related to the particle size of the dry cement. It will be appreciated that the final output from the terminals 102 and 104 may be transmitted to a recording instrument for use by the operators of the grinding and classifying equipment, or it may be employed as the input signal of a control circuit which adjusts the process equipment automatically. In either case the sequence of steps required for each test may be effected through a control panel having manual or automatic time controls, or both.

In summary, it is again pointed out that the feature of the present invention which relates to the preparation of a standard-porosity sample without resorting to a weighing operation, depends on compacting a mass of the test material to a predetermined porosity but not on the manner in which the compaction and porosity measurement are carried out. The illustrated piston arrangement is highly convenient because it renders the subsequent measurement of sample length simple, but compaction can be effected also by thorough vibration of the sample tube 16 and by the compressive action of compressed air delivered to one end of the sample in the form of high pressure pulses. Porosity of the sample can be measured by techniques which involve the absorption of wave energy by the sample. One known form of instrument comprises a small source of gamma radiation and a detector such as an ionization chamber. In use, the radiation source is placed on one side of the sample, and the detector is placed on the other side so as to measure the radiation which passes through the sample. When the instrument has been calibrated with a sample of the same material the detector reading can be employed as a direct measure of porosity.

With respect to the measurement of the length of the compacted sample and the use of this value to correct the gas permeability measurement, it is apparent that other methods than the illustrated piston-wiper technique can be employed. For example, a series of small capacitor plates arranged vertically along the length of the sample tube 16 can be employed to indicate electrically the upper level of the compacted sample, and this signal can be electrically combined with the output signal of the permeability instrument. It has already been explained that the latter may be any of several different types which are available commercially.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. A method of testing a powdered solid material to determine its fineness comprising: selecting an initial sample of the material of indeterminate weight; compacting said sample in a lengthwise direction while measuring its porosity and continuing the compacting until said sample has a predetermined porosity; measuring the fluid permeability of the compacted sample in the lengthwise direction by known permeability techniques including the steps of establishing a differential fluid pressure across said sample, causing the fluid to flow through said sample, and producing a signal which is indicative of the fluid permeability of said sample; measuring the length of the compacted sample and producing a signal which is indicative of the length; and adjusting the permeability signal in accordance with the length signal to thereby give a permeability signal which is compensated for the variable length of the compacted sample and which is indicative of the fineness of the material from which the sample was taken.

2. A method as in claim 1 wherein the width of the sample is maintained constant during compensation and wherein the step of measuring the porosity of the sample includes measuring the electrical capacitance of the sample in the widthwise direction.

3. A method as in claim 1 wherein the compacting step includes forcing a piston against one end of the sample while supporting the sides and the other end of the sample and wherein the length measuring step includes measuring the extent of piston movement during the compacting step.

4. A method as in claim 1 wherein the length of the initial sample is adjusted to a predetermined length prior to the compacting step and wherein the subsequent length measuring step measures the change in length of the sample during the compacting step.

5. A method of testing a comminuted material comprising: placing a sample of indeterminate weight in a generally vertical tubular member having a porous bottom wall and nonporous side walls; compacting the sample by forcing a piston downwardly against the upper surface of the sample while measuring the density of the sample; stopping the piston when the sample has a predetermined density; measuring the gas permeability of the sample in a vertical direction by known permeability techniques including the steps of establishing a differential gas pressure across the sample, causing the fluid to flow through the sample and producing an electrical signal which is indicative of the gas permeability of the sample; measuring the length of piston travel during the compaction step and producing a signal which is indicative of the length of piston travel; and adjusting the gas permeability signal in accordance with the length signal to thereby give a gas permeability signal which compensates for the variable length of the compacted sample and which is indicative of the fineness of the material from which the sample was taken.

6. The method of claim 5 including the step of adjusting the volume of the sample in said tube prior to compacting so as to dispose the upper surface of the sample at a predetermined level relative to the bottom wall of said tube, and wherein the length measuring step includes measuring the distance between said predetermined level and the upper surface of the sample after compaction.

7. Apparatus for testing a finely divided solid material to determine its fineness comprising: means defining a tube having a closed porous end; inlet means remote from said closed porous end for introducing into said tube a fixed volume of the material to be tested; means associated with said tube for uniformly compacting in the lengthwise direction a sample of the material which has been introduced into said tube whereby the length of said sample changes; control means for said compacting means responsive to a predetermined density of the compacted material to stop the operation of said compacting means; means associated with said tube for measuring the gas permeability of the compacted sample of material in said lengthwise direction and for generating a signal indicative of the gas permeability; measuring means for measuring the length of the compacted sample and for generating a signal indicative of said change; and means responsive to both said gas permeability signal and said length signal for generating an output signal which is indicative of the gas permeability of the compacted body of material compensated for the length of the compacted body and which is thereby indicative of the gas permeability of a compacted body of the material of standardized density and standardized length, said output signal being useful as a measurement of the fineness of the material being tested.

8. Apparatus as in claim 7 wherein said compacting means includes a piston reciprocable in said tube and wherein said measuring means for measuring the length of the compacted sample is responsive to the position of the piston when the latter is stopped by said control means.

9. Apparatus as in claim 7 further including vibrator means associated with said tube for distributing and settling material uniformly in said tube whereby upon compaction the density of the compacted sample will be uniform throughout the sample.

10. Apparatus as in claim 7 wherein said tube is generally vertical and wherein said introducing means includes means for delivering the material above said closed end to fall by gravity and an outlet aperture in the wall of said tube at a location below said delivering means whereby material will fill said tube to the level of said outlet aperture and then flow through said oulet aperture, said apparatus further including vibrator means associated with said tube for distributing and settling material uniformly therein between said closed end and said outlet aperture, the latter permitting material to be introduced into said tube over a period of time to fill the space made available by settling and at the same time preventing overfilling of said tube.

References Cited

UNITED STATES PATENTS

| | | | |
|---|---|---|---|
| 2,392,636 | 1/1946 | Boehler | 73—38 |
| 2,392,637 | 1/1946 | Boehler | 73—38 |
| 2,888,823 | 6/1959 | Hertel | 73—38 |
| 3,060,724 | 10/1962 | Smith et al. | 73—38 X |

S. CLEMENT SWISHER, *Acting Primary Examiner.*

JOSEPH W. ROSKOS, *Assistant Examiner.*

U.S. Cl. X.R.

73—38